(12) United States Patent
Hong et al.

(10) Patent No.: US 11,223,093 B2
(45) Date of Patent: Jan. 11, 2022

(54) BATTERY MODULE COMPRISING BUS BAR ASSEMBLY

(71) Applicant: LG CHEM, LTD., Seoul (KR)

(72) Inventors: Soon-Chang Hong, Daejeon (KR); Tae-Wook Kim, Daejeon (KR); Myung-Ki Park, Daejeon (KR); Jason Chong-Hoon Kwon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 148 days.

(21) Appl. No.: 16/611,353

(22) PCT Filed: Nov. 29, 2018

(86) PCT No.: PCT/KR2018/015010
§ 371 (c)(1),
(2) Date: Nov. 6, 2019

(87) PCT Pub. No.: WO2019/117514
PCT Pub. Date: Jun. 20, 2019

(65) Prior Publication Data
US 2020/0144580 A1   May 7, 2020

(30) Foreign Application Priority Data
Dec. 14, 2017   (KR) .......................... 10-2017-0172515

(51) Int. Cl.
*H01M 10/00*   (2006.01)
*H01M 50/531*   (2021.01)
(Continued)

(52) U.S. Cl.
CPC ..... *H01M 50/531* (2021.01); *H01M 10/4257* (2013.01); *H01M 50/20* (2021.01); *H01M 50/502* (2021.01)

(58) Field of Classification Search
CPC .. H01M 50/531; H01M 50/20; H01M 50/502; H01M 10/4257; H01M 2220/20; Y02E 60/10
See application file for complete search history.

(56) References Cited

U.S. PATENT DOCUMENTS 9,755,212 B2 *   9/2017   Kedir .................... B60L 50/64
2011/0287299 A1   11/2011   Kim
(Continued)

FOREIGN PATENT DOCUMENTS

CN   102263301 A   11/2011
CN   103069284 A   4/2013
(Continued)

OTHER PUBLICATIONS

Machine translation of WO-2014192720-A1, obtained Jun. 2021 (Year: 2014).*
(Continued)

*Primary Examiner* — Nicholas P D'Aniello
(74) *Attorney, Agent, or Firm* — Morgan, Lewis & Bockius LLP (57) ABSTRACT

Disclosed is a battery module comprising a cell assembly including a plurality of secondary batteries stacked in at least one direction, and a bus bar assembly including a plurality of bus bars configured to electrically connect the plurality of secondary batteries and having at least one perforation hole into which the electrode leads are inserted, and a bus bar frame configured so that the plurality of bus bars are mounted to an outer side surface thereof, wherein the bus bar frame includes: a bus bar fixing portion having an insert space elongated in the right and left direction, the bus bar fixing portion fixing a top end and a bottom end of the bus bar, and a bus bar open portion opened so that the perforation hole of the bus bar is exposed inwards as the
(Continued)

position of the bus bar in the right and left direction is changed.

8 Claims, 10 Drawing Sheets

(51) Int. Cl.
  *H01M 10/42* (2006.01)
  *H01M 50/20* (2021.01)
  *H01M 50/502* (2021.01)

(56) References Cited

U.S. PATENT DOCUMENTS

| | | |
|---|---|---|
| 2013/0143086 A1 | 6/2013 | Lee et al. |
| 2014/0030581 A1 | 1/2014 | Kim |
| 2015/0144409 A1 | 5/2015 | Fujii |
| 2015/0171401 A1 | 6/2015 | Kim et al. |
| 2015/0263394 A1 | 9/2015 | Yoshioka |
| 2015/0303415 A1 | 10/2015 | Kayano et al. |
| 2016/0133906 A1 | 5/2016 | Kedir et al. |
| 2016/0233476 A1 | 8/2016 | Okamoto et al. |
| 2016/0248068 A1* | 8/2016 | Ha ................. H01M 50/172 |
| 2017/0141366 A1* | 5/2017 | Inakawa ............ H01M 50/50 |
| 2018/0006281 A1 | 1/2018 | Eom et al. |
| 2018/0194235 A1* | 7/2018 | Kim ..................... B60L 11/18 |
| 2018/0261810 A1 | 9/2018 | Jung et al. |

FOREIGN PATENT DOCUMENTS

| | | |
|---|---|---|
| JP | 2010-225552 A1 | 10/2010 |
| JP | 2014-032949 A | 2/2014 |
| JP | 2014-110219 A1 | 6/2014 |
| JP | 2014-116160 A | 6/2014 |
| JP | 2015-49931 A | 3/2015 |
| JP | 2015-056342 A | 3/2015 |
| JP | 2017-59481 A | 3/2017 |
| JP | 2017-084469 A | 5/2017 |
| JP | 2017-188233 A | 10/2017 |
| KR | 10-2011-0044130 A | 4/2011 |
| KR | 10-2014-0137044 A | 12/2014 |
| KR | 10-2015-0049959 A | 5/2015 |
| KR | 10-2015-0052755 A | 5/2015 |
| KR | 10-2016-0055616 A | 5/2016 |
| KR | 10-2016-0076209 A | 6/2016 |
| KR | 10-2017-0050510 A | 5/2017 |
| KR | 20-2017-0001766 U | 5/2017 |
| KR | 10-2017-0066896 A | 6/2017 |
| KR | 20-2017-0002183 U | 6/2017 |
| KR | 10-2017-0094985 A | 8/2017 |
| KR | 10-2017-0095077 A | 8/2017 |
| WO | 2014/034079 A1 | 3/2014 |
| WO | 2014/073443 A1 | 5/2014 |
| WO | WO-2014192720 A1 * | 12/2014 .......... H01M 50/502 |
| WO | 2017/045781 A1 | 3/2017 |
| WO | 2017/150807 A | 9/2017 |

OTHER PUBLICATIONS

First Office Action dated Nov. 30, 2020, issued in corresponding Japanese Patent Application No. 2019-560340.
Extended European Search Report dated Oct. 29, 2020, issued in corresponding European Patent Application No. 18889754.0.
Office Action dated Oct. 27, 2020, issued in corresponding Korean Patent Application No. 10-2017-0172515.
International Search Report issued in corresponding International Patent Application No. PCT/KR2018/015010, dated Mar. 19, 2019.
Office Action dated Nov. 24, 2021, issued in corresponding Chinese Patent Application No. 2018800364254.

* cited by examiner

BATTERY MODULE COMPRISING BUS BAR ASSEMBLY

TECHNICAL FIELD

The present disclosure relates to a battery module including a bus bar assembly, and more particularly, to a battery module having a reduced product manufacturing cost through a design change of an inner configuration.

The present application claims priority to Korean Patent Application No. 10-2017-0172515 filed on Dec. 14, 2017 in the Republic of Korea, the disclosures of which are incorporated herein by reference.

BACKGROUND ART

Secondary batteries currently commercialized include nickel cadmium batteries, nickel hydrogen batteries, nickel zinc batteries, lithium secondary batteries and so on. Among them, the lithium secondary batteries are more highlighted in comparison to nickel-based secondary batteries due to advantages such as free charging and discharging, caused by substantially no memory effect, very low self-discharge rate, and high energy density.

The lithium secondary battery mainly uses lithium-based oxides and carbonaceous materials as a positive electrode active material and a negative electrode active material, respectively. The lithium secondary battery includes an electrode assembly in which a positive electrode plate coated with the positive electrode active material and a negative electrode plate coated with the negative electrode active material are disposed with a separator being interposed therebetween, and an exterior, namely a pouch exterior, sealably containing the electrode assembly together with an electrolyte.

Generally, the lithium secondary battery may be classified into a can-type secondary battery in which an electrode assembly is included in a metal can and a pouch-type secondary battery in which an electrode assembly is included in a pouch made of an aluminum sheet, depending on the shape of the exterior.

In recent years, secondary batteries have been widely used not only in small-sized devices such as portable electronic devices but also in medium-sized or large-sized devices such as vehicles and power storage devices. When the secondary batteries are used in the middle-sized or large-sized devices, a large number of secondary batteries are electrically connected to increase capacity and power. In particular, pouch-type secondary batteries are widely used for the middle-sized or large-sized devices since they may be easily stacked.

In addition, in order for the secondary battery to be electrically connected inside the battery module, the electrode leads are connected to each other, and the connection portions are welded to maintain the connection. Further, the battery module may have parallel and/or serial electrical connections between the secondary batteries, and for this, one end of the electrode lead is fixed by welding or the like in contact with a bus bar for electrical connection between the secondary batteries.

Also, the electrical connection between the secondary batteries is frequently performed by bonding the electrode leads to the bus bar. At this time, in order to electrically connect the secondary batteries in parallel, electrode leads of the same polarity are connected to each other. Also, in order to electrically connect the secondary batteries in series, electrode leads of different polarities are connected to each other.

Further, in order to apply a plurality of the bus bars, the battery module includes a bus bar frame made of an insulating material on which the bus bars may be mounted.

However, in the electrical connection of the plurality of secondary batteries applied to the existing battery module, namely among the secondary batteries applied, it is needed to change the kind of the bus bars and the shape of the bus bar frame whenever the number of secondary batteries electrically connected in series and the number of secondary batteries connected in parallel are changed.

In addition, at the bus bar assemblies respectively applied to a front portion and a rear side of the battery module, the bus bar frames respectively applied to the front portion and the rear side should be designed to have different shapes depending on whether the module bus bar for mounting the module terminal is applied or not. Accordingly, it is necessary to fabricate two types of bus bar frames at one battery module, thereby causing an increase in the manufacturing cost.

As a result, in the conventional technique, since the design of the bus bar frame should be changed frequently due to the design change of the battery module, the shapes of the bus bar and the bus bar frame are dualized more severely, and the redesign of the bus bar and the bus bar frame increases a design cost and requires the fabrication of a new mold. Moreover, due to the verification work for a fabricated product, the manufacturing cost is increased and the manufacturing time is elongated.

Therefore, it is necessary to provide a battery module capable with a reduced manufacturing cost of a product through a design change of the inner configuration.

DISCLOSURE

Technical Problem

The present disclosure is designed to solve the problems of the related art, and therefore the present disclosure is directed to providing a battery module, which may have a reduced manufacturing cost of a product through a design change of the inner configuration.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module, comprising:

a cell assembly including a plurality of secondary batteries that respectively have a plurality of electrode leads and are arranged to be stacked in at least one direction; and a bus bar assembly including a plurality of bus bars configured to electrically connect the plurality of secondary batteries and having at least one perforation hole into which the electrode leads are inserted, and a bus bar frame configured so that the plurality of bus bars are mounted to an outer side surface thereof, wherein the bus bar frame includes:

a bus bar fixing portion having an insert space elongated in the right and left direction so that a position of the bus bar in the right and left direction is freely set, the bus bar fixing portion being configured to fix a top end and a bottom end of the bus bar; and a bus bar open portion opened so that the perforation hole of the bus bar is exposed inwards as the position of the bus bar in the right and left direction is changed.

Also, the bus bar may have a plate shape, and a perforation hole perforated in the front and rear direction may be formed in the plate shape of the bus bar.

Further, the bus bar fixing portion may have a hook structure whose hook shape is elongated in the right and left direction to press at least one of the top end and the bottom end of the bus bar in the inward direction.

In addition, the bus bar fixing portion may have an insert groove into which at least one of the top end and the bottom end of the bus bar is inserted, the insert groove having an upward or downward recess elongated in the right and left direction.

Moreover, a plurality of fixing protrusions protruding toward the bus bar may be formed at predetermined intervals on an inner surface of the insert groove.

Also, a fitting groove having an upward recess may be formed at an end of the bus bar so that the fixing protrusion is inserted therein.

Further, a distance adjusting rod disposed between the plurality of bus bars and elongated in the right and left direction may be inserted into the insert groove.

In addition, a compressing protrusion configured to press the bottom end of the bus bar in the outward direction may be formed at an inner surface of the insert groove.

Moreover, the open portion of the bus bar may be opened in a length greater than the length of the bus bar in the right and left direction.

Also, the open portion of the bus bar may have a single opening so that a rear surface of the plurality of bus bars mounted to the outer side surface is partially exposed inwards.

In another aspect of the present disclosure, there is also provided a battery module, comprising: a cell assembly including a plurality of secondary batteries that respectively have a plurality of electrode leads and are arranged to be stacked in at least one direction; and a bus bar assembly including a plurality of bus bars configured to electrically connect the plurality of secondary batteries and having at least one perforation hole into which the electrode leads are inserted, the plurality of bus bars being electrically connected to a sensing circuit board, and a bus bar frame configured so that the plurality of bus bars are mounted to an outer side surface thereof.

In addition, the bus bar frame may include a bus bar fixing portion having an insert space elongated in the right and left direction so that a position of the bus bar in the right and left direction is freely set, the bus bar fixing portion being configured to fix a top end and a bottom end of the bus bar; and a bus bar open portion opened so that the perforation hole of the bus bar is exposed inwards as the position of the bus bar in the right and left direction is changed.

Further, the bus bar fixing portion may have an insert groove into which at least one of the top end and the bottom end of the bus bar is inserted, the insert groove having an upward or downward recess elongated in the right and left direction, and Also, a plurality of fixing protrusions protruding toward the bus bar may be formed at predetermined intervals on an inner surface of the insert groove, and a fitting groove having an upward recess may be formed at an end of the bus bar so that the fixing protrusion is inserted therein.

In another aspect of the present disclosure, there is also provided a battery pack, comprising the battery module as above.

In another aspect of the present disclosure, there is also provided a vehicle, comprising the battery pack as above.

Advantageous Effects

According to an embodiment of the present disclosure, since the battery module includes a bus bar fixing portion so that the position of the bus bar in the right and left direction may be freely set at the bus bar frame, a bus bar open portion is provided to form an opening through which the perforation hole of the bus bar is exposed inwards by changing the position of the bus bar in the right and left direction, without any influence due to the change of position of the bus bar caused by a design change. Therefore, it is possible to reset the position of the bus bar in the right and left direction without changing the design of the bus bar frame.

Further, according to this embodiment of the present disclosure, since the bus bar fixing portion has a hook structure and an insert groove extending in the right and left direction so that the position to which the bus bar is fixed may be freely set, even though the size or position of the bus bar is changed due to a design change of the battery module, it is possible to use the existing bus bar frame without designing or manufacturing the bus bar frame newly, thereby greatly reducing the production cost of the battery module.

In addition, according to an embodiment of the present disclosure, since the bus bar frame has a separate hook structure to fix the module bus bar, even though the module bus bar is not applied to the bus bar frame, it is possible to use the existing bus bar frame, without change the design of the bus bar frame. Accordingly, the bus bar frame may be applied to both front and rear sides of the battery module, thereby effectively reducing the design cost and manufacturing cost of the bus bar frame.

Moreover, according to an embodiment of the present disclosure, since by using the coupling structure between a fixing protrusion formed in the insert groove provided at the bus bar fixing portion and a fitting groove formed at the bus bar, the present disclosure is possible to prevent the bus bar from moving in the right and left direction at the set position. In addition, the insert groove may guide the rotational movement so that a top end of the bus bar may be inserted into the hook structure after the bus bar is inserted into the insert groove, thereby improving the manufacturing efficiency of the bus bar assembly.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
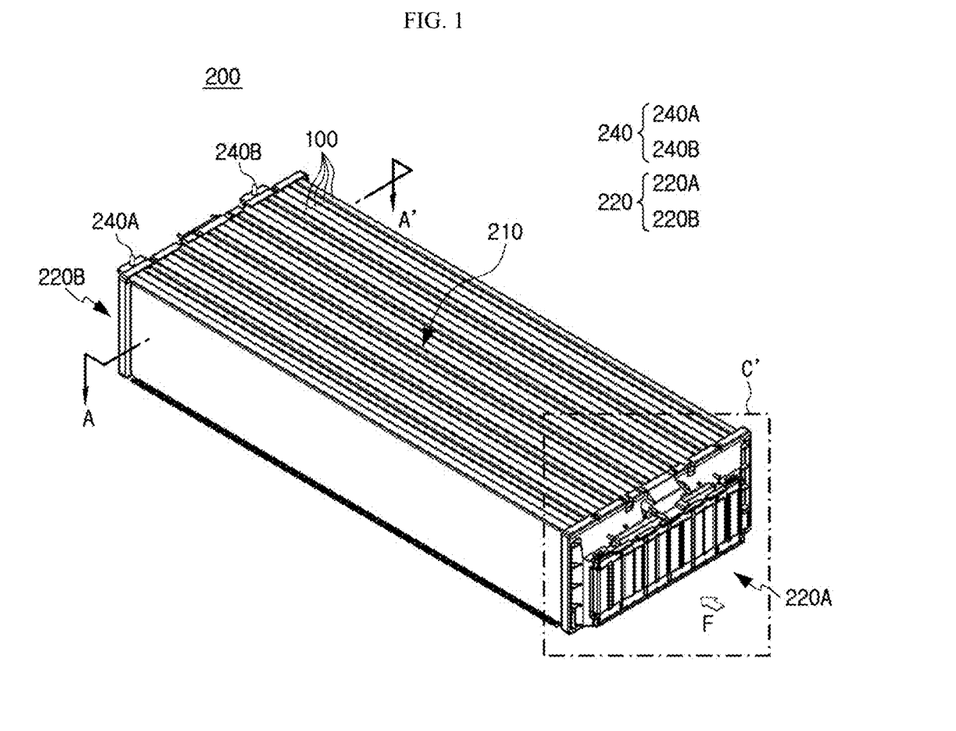
FIG. 1 is a perspective view schematically showing a battery module according to an embodiment of the present disclosure.

FIG. 1 is a perspective view schematically showing a battery module according to an embodiment of the present disclosure. In addition, FIG. 2 is a side view schematically showing a secondary battery employed at the battery module according to an embodiment of the present disclosure.

Figure 2:
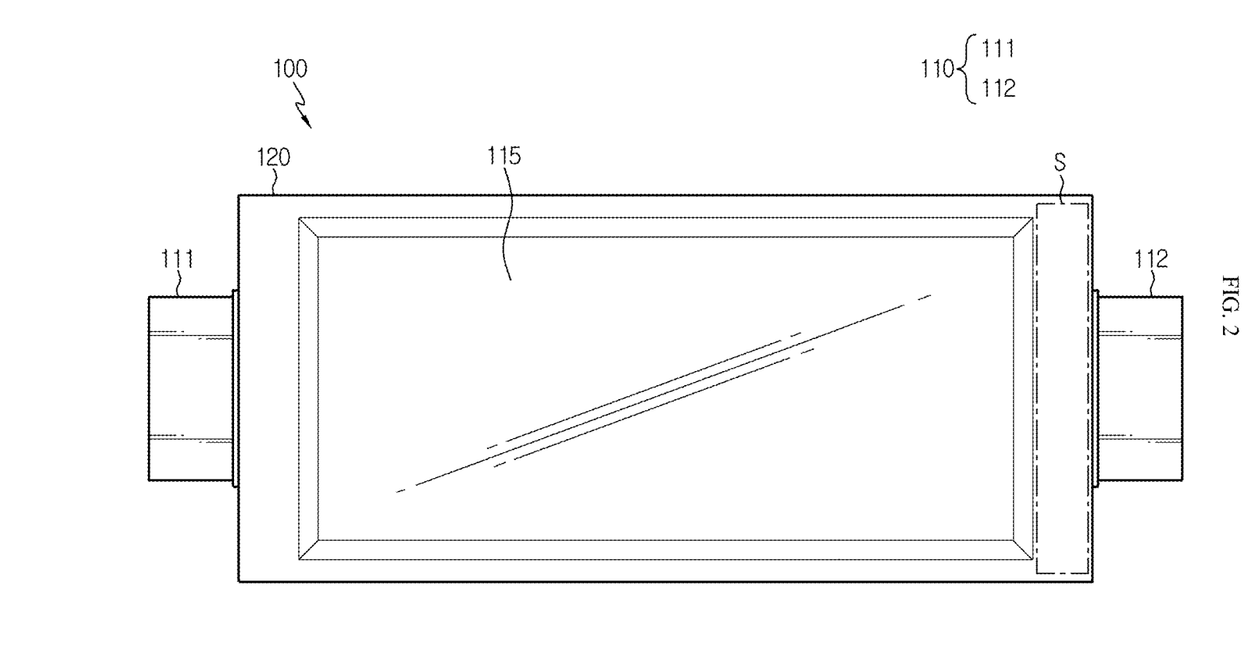
FIG. 2 is a side view schematically showing a secondary battery employed at the battery module according to an embodiment of the present disclosure.

Referring to FIGS. 1 and 2, a battery module 200 according to an embodiment of the present disclosure includes a cell assembly 210 and a bus bar assembly 220.

Here, the cell assembly 210 may include a plurality of secondary batteries 100 arranged in the right and left direction.

Specifically, the secondary battery 100 may be a pouch-type secondary battery 100. In particular, the pouch-type secondary battery 100 may include an electrode assembly, an electrolyte, and a pouch 120.

Here, the pouch 120 may have an accommodation portion 115 of a concave shape. Also, the accommodation assembly 115 may accommodate the electrode assembly (not shown) and the electrolyte (not shown). In addition, the pouch includes an outer insulation layer, a metal layer and an inner adhesive layer, and the inner adhesive layers are adhered to each other at a rim portion of the pouch 120 to form a sealing portion. Further, terrace portions S may be respectively formed at both ends of the pouch 120 where a positive electrode lead 111 and a negative electrode lead 112 are formed.

In addition, the electrode assembly is an assembly of an electrode and a separator, and at least one positive electrode plate and at least one negative electrode plate may disposed with a separator interposed therebetween. The positive electrode plate of the electrode assembly includes a positive electrode tab, and at least one positive electrode tab may be connected to the positive electrode lead 111.

Here, one end of the positive electrode lead 111 is connected to the positive electrode tab and the other end thereof is exposed out of the pouch 120. The exposed portion may function as an electrode terminal of the secondary battery 100, for example a positive electrode terminal of the secondary battery 100.

In addition, the negative electrode plate of the electrode assembly includes a negative electrode tab, and at least one negative electrode tab may be connected to the negative electrode lead 112. Also, one end of the negative electrode lead 112 is connected to the negative electrode tab and the other end thereof is exposed out of the pouch 120. The exposed portion may serve as an electrode terminal of the secondary battery 100, for example a negative electrode terminal of the secondary battery 100.

Further, the positive electrode lead 111 and the negative electrode lead 112 may be formed at both ends opposite to each other based on the center of the secondary battery 100. That is, the positive electrode lead 111 may be provided at one end portion with respect to the center of the secondary battery 100. In addition, the negative electrode lead 112 may be provided at the other end portion with respect to the center of the secondary battery 100. For example, as shown in FIGS. 1 and 2, each secondary battery 100 may be respectively configured so that the positive electrode lead 111 and the negative electrode lead 112 protrude forward and backward, respectively.

Thus, according to this configuration of the present disclosure, in one secondary battery 100, there is no interference between the positive electrode lead 111 and the negative electrode lead 112, and thus it is possible to broaden the area of the electrode lead 110.

Also, the positive electrode lead 111 and the negative electrode lead 112 may be configured to have a plate form. In particular, the positive electrode lead 111 and the negative electrode lead 112 may protrude horizontally in a standing state so that their broad surfaces face left and right.

In addition, the secondary battery 100 may be provided in plural in the battery module 200, and the plurality of secondary batteries 100 may be arranged to be stacked in at least one direction. For example, as shown in FIGS. 1 and 2, a plurality of pouch-type secondary batteries 100 may be stacked one on another in parallel in the right and left direction.

At this time, each pouch-type secondary battery 100 may be disposed to stand approximately perpendicular to the ground so that two broad surfaces positioned are respectively located at left and right and the sealing portions are located at upper, lower, front and rear portions, when viewed in the direction F (shown in FIG. 1). In other words, each secondary battery 100 may be configured in a vertically standing form. Meanwhile, in this specification, the upper, lower, front, rear, right and left directions are set based on the direction F, unless otherwise specified.

However, the battery module 200 according to the present disclosure is not limited to the pouch-type secondary battery 100 described above, and various kinds of secondary batteries 100 known at the time of filing of this application may be employed.

Figure 3:
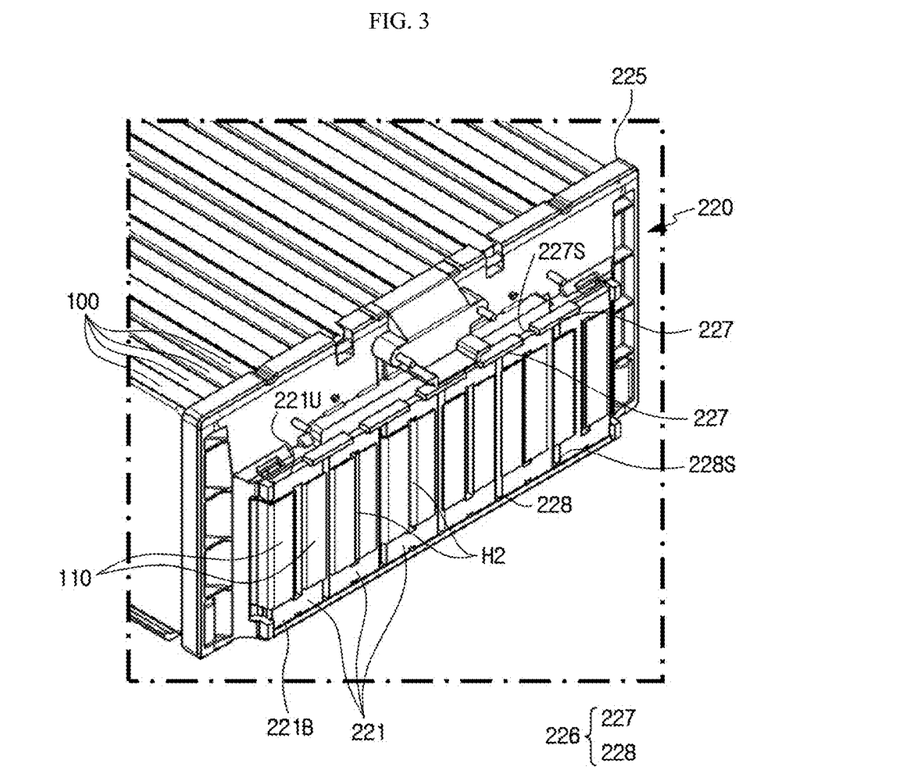
FIG. 3 is a partially enlarged perspective view showing a portion C' of the battery module of FIG. 1.

FIG. 3 is a partially enlarged perspective view showing a portion C' of the battery module of FIG. 1. In addition, FIG. 4 is a horizontally sectioned view schematically showing the battery module, taken along the line A-A' of FIG. 1.

Figure 4:
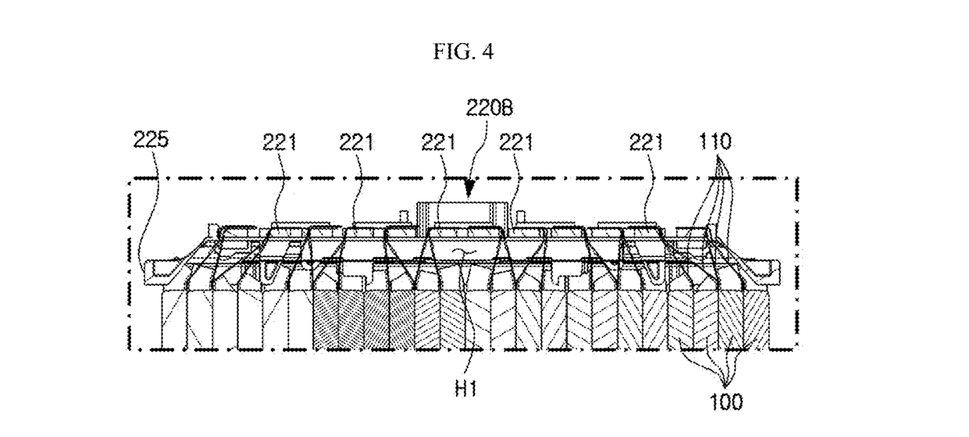
FIG. 4 is a horizontally sectioned view schematically showing the battery module, taken along the line A-A' of FIG. 1.

Referring to FIGS. 3 and 4 together with FIG. 1, the bus bar assembly 220 may be located at the front or rear of the cell assembly 210. In addition, the bus bar assembly 220 includes a plurality of bus bars 221 and a bus bar frame 225.

Specifically, the bus bar 221 may have a conductive material to electrically connect the plurality of secondary batteries 100. That is, the bus bar 221 may have a conductive material with relatively high electrical conductivity at a region that is in contact with the electrode lead 111 provided at each of the plurality of secondary batteries 100. For example, the bus bar may have a copper alloy, or an aluminum alloy.

For example, the bus bar 221 may contact a plurality of electrode leads 111 of the same polarity or a plurality of electrode leads 112 of different polarities to electrically connect the plurality of secondary batteries 100.

Moreover, the bus bar 221 may have a metal plate shape. Specifically, the metal plate shape may have a bar shape elongated in one direction.

Also, one end of the bus bar 221 may be electrically connected to a sensing circuit board (not shown) by a sensing lead (not shown). Further, the sensing circuit board may include a measuring element for measuring voltage, current or the like of the plurality of secondary batteries 100.

In addition, the bus bar frame 225 may be mounted to an outer side surface of the bus bar 221. In addition, the bus bar frame 225 may have an insulating material to be electrically insulated from the bus bar 221. For example, the bus bar frame 225 may have a plastic material.

Further, the bus bar frame 225 may have a bus bar fixing portion 226 configured to fix a top end 221U and a bottom end 221B of the bus bar 221.

Specifically, the bus bar fixing portion 226 may have insert spaces 227S, 228S elongated in the right and left direction so that the position of the bus bar 221 in the right and left direction may be freely set. That is, the top end 221U or the bottom end 221B of the bus bar 221 may be inserted into and fixed in the insert spaces 227S, 228S of the bus bar fixing portion 226. Accordingly, the bus bar 221 may be fixed suitable for a set position of the bus bar 221 in the right and left direction at the outer side surface of the bus bar frame 225.

Figure 5:
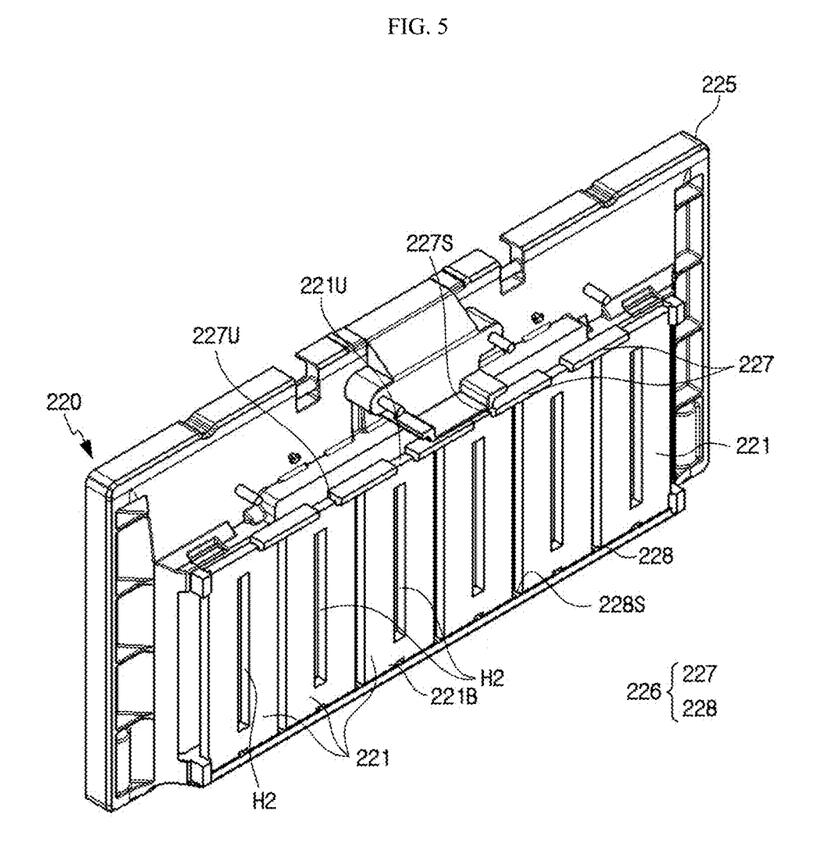
FIG. 5 is a perspective view schematically showing a bus bar and a bus bar frame, employed at the battery module according to an embodiment of the present disclosure.

FIG. 5 is a perspective view schematically showing a bus bar and a bus bar frame, employed at the battery module according to an embodiment of the present disclosure. In addition, FIG. 6 is a front view schematically showing a bus bar frame, employed at the battery module according to an embodiment of the present disclosure.

Figure 6:
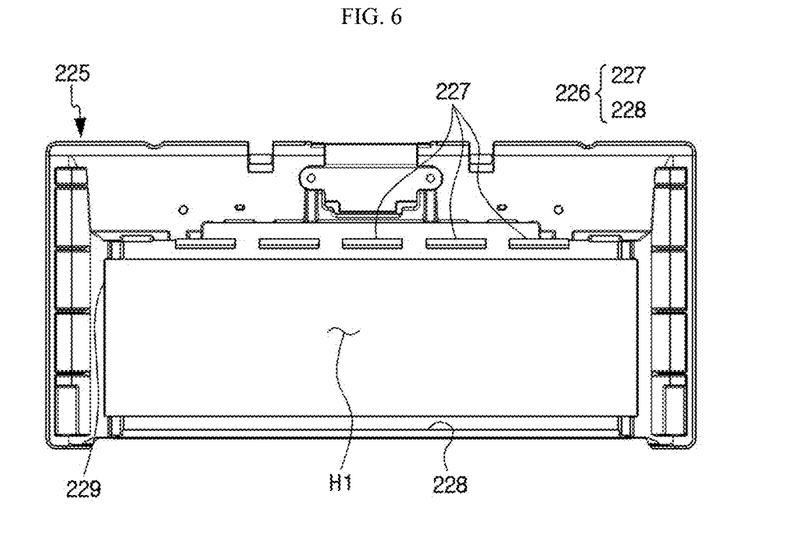
FIG. 6 is a front view schematically showing a bus bar frame, employed at the battery module according to an embodiment of the present disclosure.

Referring to FIGS. 5 and 6 together with FIG. 4, at least one perforation hole H2 may be formed in the plurality of bus bars 221 so that the electrode lead 110 is inserted therein.

In addition, the bus bar frame 225 may have a bus bar open portion 229 with an opening H1 so that the perforation hole H2 of the bus bar 221 is exposed inwards as the position of the bus bar 221 in the right and left direction is changed. Further, the perforation hole H2 may be formed through the plate shape of the bus bar 221 in the front and rear direction.

That is, the opening H1 may formed in the bus bar open portion 229 so that the bus bar 221 mounted to the bus bar frame 225 may be partially exposed inwards even though the position of the bus bar 221 in the right and left direction is changed. Also, on occasions, the bus bar open portion 229 may have a plurality of openings (not shown). In addition, each of the plurality of openings may have a length greater than the length of one bus bar 221 in the right and left direction.

Alternatively, the bus bar open portion 229 may have a single opening H1, rather than a plurality of openings. Further, the opening H1 may be formed wider than the sum of widths of the plurality of bus bars 221 in the right and left direction. That is, a single opening H1 may be formed in the bus bar open portion 229 so that the rear surface of the plurality of bus bars 221 mounted to the outer side surface is partially exposed inwards.

Thus, according to this configuration of the present disclosure, the bus bar fixing portion 226 may be formed at the bus bar frame 225 so that the position of the bus bar 221 in the right and left direction may be freely set, and the bus bar open portion 229 is provided so that the opening H1 into which the electrode lead 110 may be inserted may be provided without affecting the position change of the bus bar 221 in the right and left direction. Thus, it is possible to reset the position of the bus bar 221 in the right and left direction without changing the design of the bus bar frame 225.

Further, even though the size of the applied bus bar 221 in the right and left direction is changed since the electrical connection configuration (a serial or parallel connection structure) of the plurality of secondary batteries 100 of the battery module 200 is changed, the bus bar frame 225 may be applied using an existing form without changing the design of the bus bar frame 225. Accordingly, it is possible to reduce the manufacturing cost incurred in preparing the battery module 200 of a new type.

Also, the bus bar 221 may have a plate shape whose front and rear surfaces are relatively wider than its side surfaces. Further, at least one perforation hole H2 may be formed in the plate shape of the bus bar 221. In addition, the electrode lead 110 of the secondary battery 100 may be inserted into the perforation hole H2.

Referring to FIGS. 3 and 4 again, an end of the electrode lead 110 inserted into the perforation hole H2 of the bus bar 221 may be bent in the right and left direction, when viewed in the direction F (see FIG. 1). Further, a side surface of the bent end of the electrode lead 110 may be in contact with the front or rear surface of the bus bar 221.

Further, the end of the electrode lead 110 inserted into the opening H1 of the bus bar frame 225 may protrude to face the side portion of the bus bar 221 in the right and left direction. Also, the end of the electrode lead 110 may be bent in the right and left direction to contact the outer side surface of the bus bar 221.

For example, as shown in FIG. 5, the bus bar assembly 220 located at the front includes six bus bars 221. Also, the six bus bars 221 may have a plate shape whose front and rear surfaces are wider than the side surfaces thereof. In addition, a single perforation hole H2 may be formed in the bus bar 221 so that the electrode lead 110 is inserted therein.

Further, for example, as shown in FIG. 3, each of the six bus bars 221 may be configured to contact the electrode leads 110 of four secondary batteries 100. In addition, among the four electrode leads 110, two electrode leads 110 are inserted to face the side portion of the bus bar 221, and the remaining two electrode leads 110 may be inserted into the perforation hole H2 of the bus bar 221 to contact the bus bar 221.

Thus, according to this configuration of the present disclosure, since the bus bar 221 has a plate shape and the perforation hole H2 is formed in the plate shape, the electrode leads 110 of the plurality of secondary batteries 100 are spaced apart and distributed at suitable intervals to ensure smooth contact between the bus bar 221 and the electrode lead 110.

Referring to FIGS. 5 and 6 again, the bus bar fixing portion 226 may have a hook structure 227 with a hook shape to press at least one of the top end 221U and the bottom end 221B of the bus bar 221 in the inward direction. In addition, one hook structure 227 may be configured to secure the top end 221U or the bottom end 221B of at least one bus bar 221.

For example, as shown in FIG. 5, the bus bar fixing portion 226 may have five hook structures 227 with a hook shape so as to press the top ends 221U of six bus bars 221 in the inward direction.

In addition, an insert space 227S elongated in the right and left direction to accommodate the top end 221U of the bus bar 221 therein may be formed at an inner side of the hook portion of the hook structure 227. Further, the top end 221U of the bus bar 221 inserted in the insert space 227S may be configured to be movable in the right and left direction inside the insert space 227S.

Thus, according to this configuration of the present disclosure, since the bus bar fixing portion 226 has the hook structure 227 elongated in the right and left direction so that the position at which the bus bar 221 is to be fixed may freely set, even though the size or position of the bus bar 221 is changed due to a design change of the battery module 200, the existing bus bar frame 225 may be used without designing or manufacturing the bus bar frame 225 newly. Accordingly, it is possible to save time and cost caused by the design change, thereby greatly reducing the production cost of the battery module 200.

Figure 7:
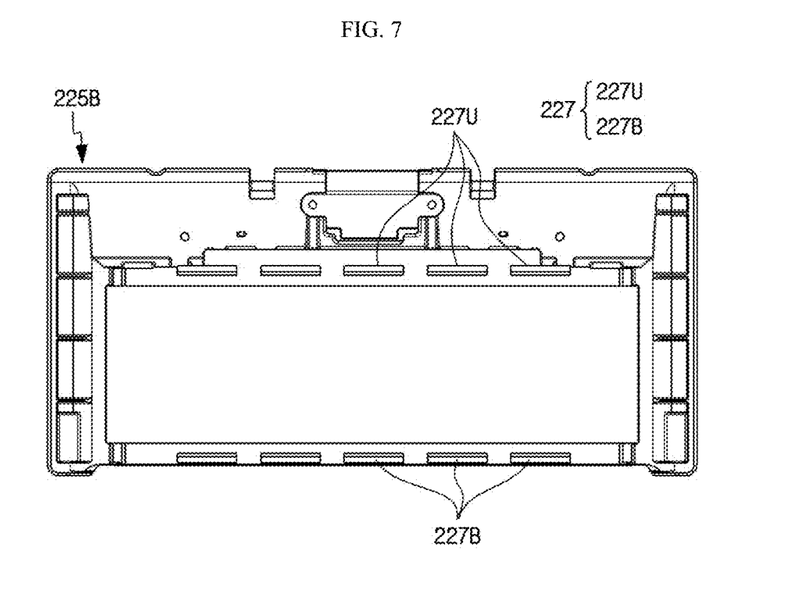
FIG. 7 is a front view schematically showing a bus bar frame, employed at a battery module according to another embodiment of the present disclosure.

FIG. 7 is a front view schematically showing a bus bar frame, employed at a battery module according to another embodiment of the present disclosure.

Referring to FIG. 7 together with FIG. 5, the bus bar fixing portion 226 provided in the battery module 200 according to another disclosure of the present disclosure may have hook structures 227U, 227B to press the top end 221U and the bottom end 221B of the bus bar 221 in the inward direction, respectively.

For example, as shown in FIG. 7, five hook structures 227U configured to fix the top end 221U of the bus bar 221 and five hook structures 227B configured to fix the bottom end 221B of the bus bar 221 may be formed at the outer side surface of the bus bar frame 225B.

Thus, according to this configuration of the present disclosure, when the hook structure 227 for respectively pressing the top end 221U and the bottom end 221B of the bus bar 221 in the inward direction is provided, the top end 221U and the bottom end 221B of the bus bar 221 may be firmly fixed to the bus bar frame 225. For this reason, it is possible to effectively prevent the bus bar 221 from being easily detached due to an external impact, and the durability of the battery module 200 may be further enhanced.

Referring to FIGS. 5 and 6 again, the bus bar fixing portion 226 may have an insert groove 228 configured so that at least one of the top end 221U and the bottom end 221B of the bus bar 221 may be inserted therein. Also, the insert groove 228 may have an upward or downward recess elongated in the right and left direction.

In addition, the insert groove 228 may have an insert space 228S elongated in the right and left direction so that the top end 221U or the bottom end 221B of the bus bar 221 is movable in the right and left direction in a state of being inserted therein.

However, the bus bar 221 may be moved in the right and left direction only by the pressing force in the right and left direction, and after the position of the bus bar 221 is completely set, the position of the bus bar 221 may be fixed by the bus bar fixing portion 226 not to move in the right and left direction.

For example, as shown in FIG. 5, an insert groove 228 may be formed at the outer side surface of the bus bar frame 225 so that the bottom ends 221B of the six bus bars 221 may be inserted and accommodated therein. Also, the insert groove 228 may have a downward recess elongated in the right and left direction. In addition, the bus bar 221 inserted into the insert groove 228 may have an insert space 228S elongated in the right and left direction so as to be movable in the right and left direction.

Thus, according to this configuration of the present disclosure, since the insert groove 228 elongated in the right and left direction is provided at the outer side of the bus bar frame 225, even though the size or position of the bus bar 221 is changed according to the design change of the battery module 200, the existing bus bar frame 225 may be used without having to design or manufacture the bus bar frame 225 newly. Accordingly, it is possible to save time and cost caused by the design change, thereby greatly reducing the production cost of the battery module 200.

Figure 8:
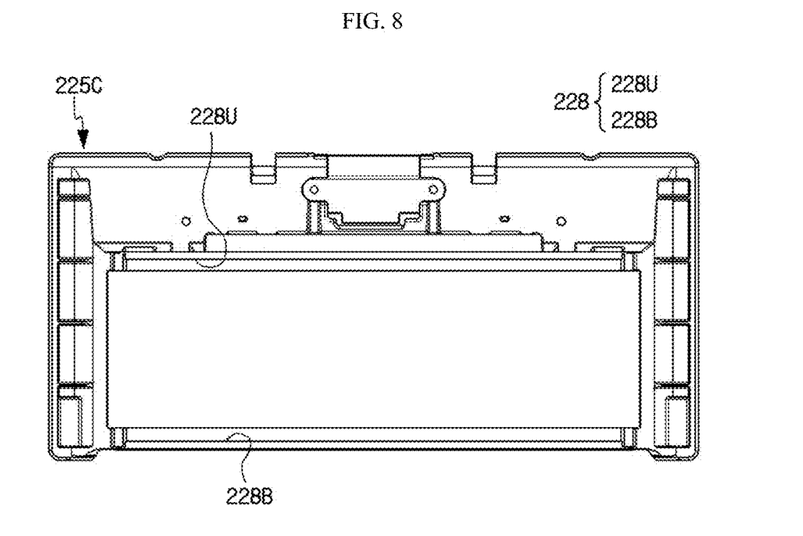
FIG. 8 is a front view schematically showing a bus bar frame, employed at a battery module according to still another embodiment of the present disclosure.

FIG. 8 is a front view schematically showing a bus bar frame, employed at a battery module according to still another embodiment of the present disclosure.

Referring to FIG. 8 together with FIG. 5, an insert groove 228U having an upward recess elongated in the right and left direction and into which the top end 221U of the bus bar 221 is inserted and an insert groove 228B having a downward recess elongated in the right and left direction into which the bottom end 221B of the bus bar 221 is inserted may be formed at the outer side surface of the bus bar frame 225C.

In addition, the bus bar frame 225C may be prepared by injection molding so that the bus bar 221 may be inserted into and fixed to the insert groove 228 formed at the bus bar frame 225C. That is, after the bus bar 221 is inserted into a mold in advance, a molten material of the bus bar frame 225C is injected and then cured into a form of the bus bar frame 225C, so that the bus bar 221 is prepared to be inserted into the bus bar frame 225C.

Accordingly, according to this configuration of the present disclosure, since the bus bar frame 225C has the insert groove 228 configured so that the top end 221U and the bottom end 221B of the bus bar 221 are movable in the right and left direction in a state of being accommodated, the position of the bus bar 221 or its size in the right and left direction may be freely set.

Figure 9:
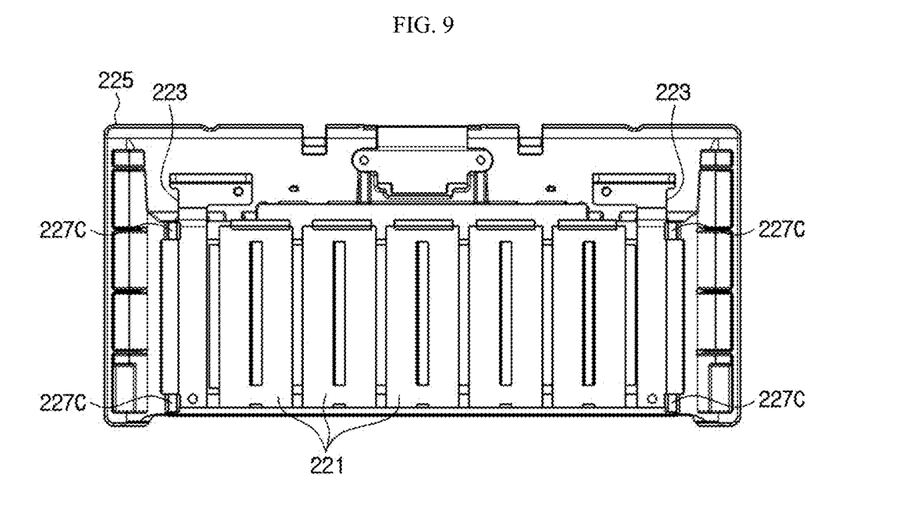
FIG. 9 is a front view schematically showing a bus bar frame located at the rear and a bus bar mounted thereto, at the battery module according to an embodiment of the present disclosure.

FIG. 9 is a front view schematically showing a bus bar frame located at the rear and a bus bar mounted thereto, at the battery module according to an embodiment of the present disclosure.

Referring to FIG. 9 together with FIG. 1, a module bus bar 223 connected to a module terminal 240 may be mounted to the bus bar frame 225 mounted to the rear side of the battery module 200. Specifically, the module bus bar 223 may be configured to electrically connect the plurality of secondary batteries 100 and the module terminal 240. Here, the module terminal 240 may include a positive electrode module terminal 240A and a negative electrode module terminal 240B according to electrical polarities, as terminals for electrical connection between the battery module 200 and an external device (not shown).

In addition, at least one hook structure 227C for pressing and fixing a side end of the module bus bar 223 may be formed at the bus bar frame 225.

For example, as shown in FIG. 9, four hook structures 227C capable of pressing the side ends of two module bus bars 223 in the right and left direction may be formed at the outer side surface of the bus bar frame 225.

Thus, according to this configuration of the present disclosure, since the hook structure 227C is separately formed at the bus bar frame 225 to fix the module bus bar 223, even though the module bus bar 223 is not applied to the bus bar frame 225, the existing bus bar frame 225 may be used without having to change the design of the bus bar frame 225. Also, since the bus bar frame 225 may be applied to both the front and rear of the battery module 200 regardless of whether the module terminal 240 is applied to the outer side surface of the bus bar frame 225, the design cost and manufacturing cost of the bus bar frame 225 can be effectively reduced.

Moreover, in addition to the secondary battery 100 and the bus bar assembly 220, the battery module 200 may further include end plates made of a metal material and located at an uppermost portion and a lowermost portion of the secondary battery 100, a duct for allowing air to flow into or out of the battery module 200, a sensing assembly having a sensing lead, a sensing circuit board and the like connected to the electrode lead 110 of the secondary battery 100 to sense the voltage or the like of the secondary battery 100, and so on.

Figure 10:
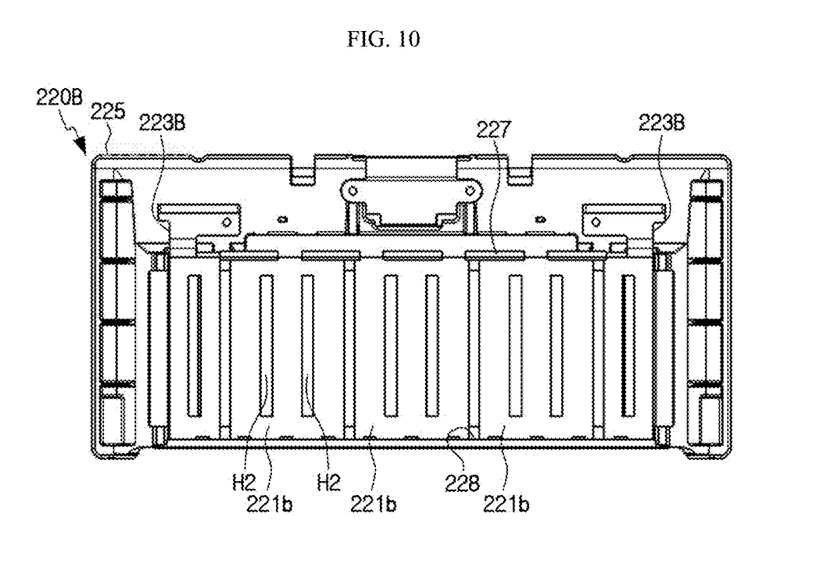
FIG. 10 is a front view schematically showing a bus bar frame located at the rear and a bus bar mounted thereto, at a battery module according to another embodiment of the present disclosure.

FIG. 10 is a front view schematically showing a bus bar frame located at the rear and a bus bar mounted thereto, at a battery module according to another embodiment of the present disclosure.

Referring to FIG. 10 together with FIGS. 1 and 6, a bus bar assembly 220B of a battery module according to another embodiment may further include a bus bar 221b having a relatively greater width in the right and left direction, compared to the bus bar 221 provided at the bus bar assembly 220 of FIG. 9. Also, two perforation holes H2 may be formed at the bus bar 221b.

That is, at least one electrode lead 110 may be inserted into each of two perforation holes H2 formed at the bus bar 221b to contact the outer side surface of the bus bar 221. Accordingly, the bus bar 221B may be applied to connect six secondary batteries 100 in parallel.

In addition, the bus bar frame 225 of FIG. 10 may include a bus bar fixing portion 226 having a plurality of hook structures 227 and an insert groove 228 capable of accommodating the bottom end 221B of the bus bar 221b.

For example, as shown in FIG. 10, the bus bar assembly 220B may include three bus bars 221b respectively having two perforation holes H2 and two module bus bars 223B respectively one perforation hole H2.

Thus, according to this configuration of the present disclosure, since the bus bar fixing portion 226 having the hook structure 227 and the insert groove 228 is formed at the bus bar frame 225 and the bus bar open portion 229 having one opening is provided, it is possible to accommodate various types of bus bars 221b with various sizes in the right and left direction.

Figure 11:
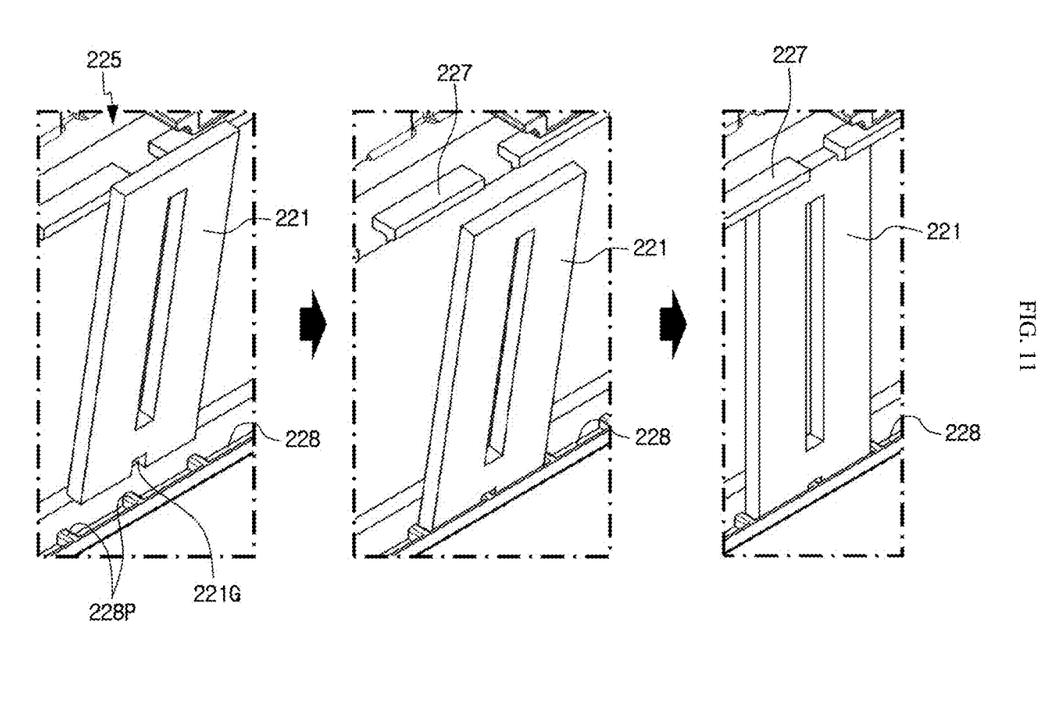
FIG. 11 is a perspective view schematically showing that the bus bar employed at the battery module according to an embodiment of the present disclosure is being mounted to the bus bar frame.

FIG. 11 is a perspective view schematically showing that the bus bar employed at the battery module according to an embodiment of the present disclosure is being mounted to the bus bar frame.

Referring to FIG. 11 together with FIG. 5, an insert groove 228 may be formed at the bus bar frame 225 so that the bottom end of the bus bar 221 is inserted therein. Also, a plurality of fixing protrusions 228P protruding toward the bus bar 221 may be formed on the inner surface of the insert groove 228 at predetermined intervals.

Further, a fitting groove 221G having an upward recess may be formed at the bottom end of the bus bar 221 so that the fixing protrusion 228P is inserted therein. In addition, the fixing protrusion 228P may be provided in plural so that the plurality of fixing protrusions 228P are spaced at regular intervals along the inner surface of the insert groove 228 in the right and left direction.

That is, in the bus bar assembly 220, the bottom end of the bus bar 221 may be inserted into the insert groove 228 so that the fitting groove 221G formed at the bottom end of the bus bar 221 and the fixing protrusion 228P formed on the inner surface of the insert groove 228 are coupled to each other. At this time, the bottom end of the bus bar 221 is inserted obliquely into the insert groove 228, and then the top end of the bus bar 221 is pressed and rotated in the inward direction based on the bottom end of the bus bar 221 to be inserted into the hook structure 227.

Thus, according to this configuration of the present disclosure, by using the coupling structure of the fixing protrusion 228P formed at the insert groove 228 and the fitting groove 221G formed at the bus bar 221, it is possible to prevent the bus bar 221 from being moved at the set position in the right and left direction. Moreover, after the bus bar 221 is inserted into the insert groove 228, it is possible to guide the rotational movement so that the top end of the bus bar 221 may be inserted into the hook structure 227, thereby enhancing the manufacturing efficiency.

Figure 12:
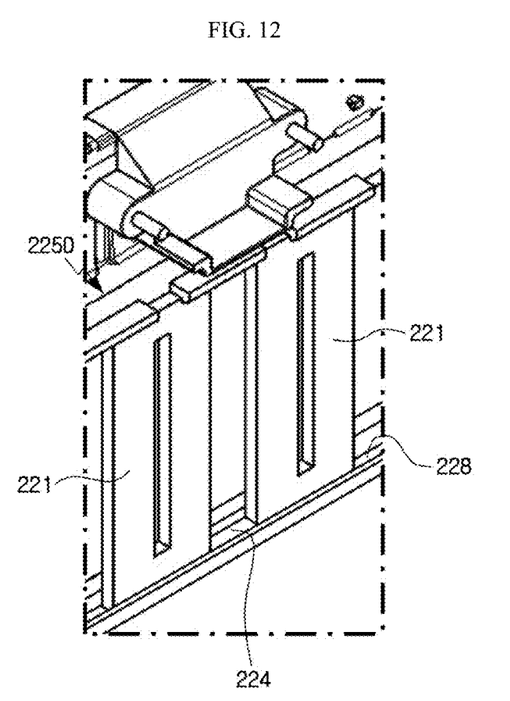
FIG. 12 is a partial perspective view schematically showing that the bus bar employed at the battery module according to another embodiment of the present disclosure is mounted to the bus bar frame.

FIG. 12 is a partial perspective view schematically showing that the bus bar employed at the battery module according to another embodiment of the present disclosure is mounted to the bus bar frame.

Referring to FIG. 12, a distance adjusting rod 224 interposed between the plurality of bus bars 221 and configured to set a distance between the plurality of bus bars 221 may be inserted into the insert groove 228 formed in at bus bar frame 225D. Specifically, the distance adjusting rod 224 may have a bar shape elongated in the right and left direction.

In addition, the distance adjusting rod 224 with a bar shape may have a width that allows to be inserted into the insert groove 228. Further, the length of the distance adjusting rod 224 in the right and left direction may be adjusted according to the size or number of the bus bars 221.

Figure 13:
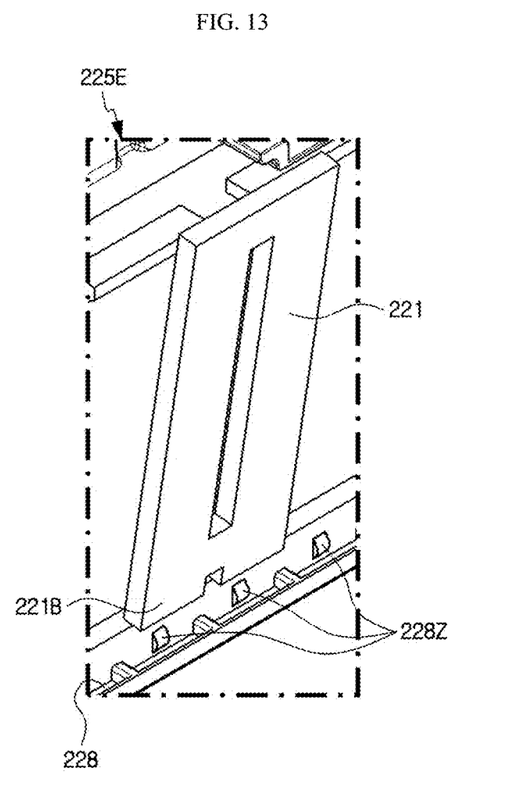
FIG. 13 is a partial perspective view schematically showing that the bus bar employed at the battery module according to another embodiment of the present disclosure is mounted to the bus bar frame.

FIG. 13 is a partial perspective view schematically showing that the bus bar employed at the battery module according to another embodiment of the present disclosure is mounted to the bus bar frame.

Referring to FIG. 13, an insert groove 228 may be formed at the bus bar frame 225E according to another embodiment so that the bottom end 221B of the bus bar 221 is inserted therein. Also, a compressing protrusion 228Z configured to press the bottom end 221B of the bus bar 221 in the outward direction may be formed at the inner surface of the insert groove 228.

Further, a plurality of compressing protrusions 228Z may be formed on the inner surface of the insert groove 228 at predetermined intervals. In addition, the compressing protrusion 228Z may be configured so that its outwardly protruding size gradually increases in the lower direction.

Thus, according to this configuration of the present disclosure, the compressing protrusion 228Z formed at the insert groove 228 may firmly fix the bus bar 221 to the bus bar frame 225 just by inserting the bottom end 221B of the bus bar 221 into the insert groove 228 in the downward direction, and thus the durability of the battery module 200 may be effectively increased.

Further, a battery pack according to the present disclosure may include at least one battery module 200 according to the present disclosure. Also, the battery pack according to the present disclosure may further include, in addition to the battery module 200, a pack case for accommodating the battery module 200, and various devices for controlling charge and discharge of the battery module 200, for example a battery management system (BMS), a current sensor, a fuse and the like.

In addition, the battery pack according to the present disclosure may be applied to a vehicle such as an electric vehicle. In other words, the vehicle according to the present disclosure may include the above battery pack.

Meanwhile, even though the terms indicating directions such as upper, lower, left, right, front and rear directions are used in the specification, it is obvious to those skilled in the art that these merely represent relative positions for convenience in explanation and may vary based on a position of an observer or an object.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, even though the terms indicating directions such as upper, lower, left, right, front and rear directions are used in the specification, it is obvious to those skilled in the art that these merely represent relative positions for convenience in explanation and may vary based on a position of an observer or an object.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

| Reference Signs | |
|---|---|
| 200: battery module | 210: cell assembly |
| 100: secondary battery | 220: bus bar assembly |
| 221: bus bar | 225: bus bar frame |
| 223: module bus bar | 240: module terminal |
| 226: bus bar fixing portion | 229: bus bar open portion |
| H1: opening | H2: perforation hole |
| 227: hook structure | 228: insert groove |
| 228P: fixing protrusion | 221G: fitting groove |
| 224: distance adjusting rod | 228Z: compressing protrusion |

INDUSTRIAL APPLICABILITY

The present disclosure relates to a battery module and a battery pack including the battery module. In addition, the battery module of the present disclosure are applicable to industries related to electronic devices or vehicles.

What is claimed is:

1. A battery module, comprising:
a cell assembly including a plurality of secondary batteries that respectively have a plurality of electrode leads and are stacked in at least one direction; and
a bus bar assembly including:
a plurality of bus bars configured to electrically connect the plurality of secondary batteries wherein each bus bar of the plurality of bus bars has a plate shape, and a perforation hole perforated in the front and rear direction is formed in the plate shape of a respective bus bar into which the electrode leads are inserted; and
a bus bar frame configured so that the plurality of bus bars are mounted to an outer side surface thereof,
wherein the bus bar frame includes:
a bus bar fixing portion having an insert space elongated in the right and left direction so that a position of each of the plurality of bus bars in the right and left direction is freely set along the insert space, the bus bar fixing portion being configured to fix a top end and a bottom end of each bus bar, and
a bus bar open portion opened so that the perforation hole of each of the plurality of bus bars is exposed inwards within the same bus bar open portion as the position of each of the plurality of bus bars in the right and left direction is changed,
wherein the bus bar fixing portion has an insert groove into which at least one of the top end and the bottom end of each bus bar of the plurality of bus bars is inserted, the insert groove having an upward or downward recess elongated in the right and left direction, and
wherein a plurality of distance adjusting rods respectively disposed between pairs of the plurality of bus bars and elongated in the right and left direction is inserted into the insert groove to maintain a separation distance between the pairs of the plurality of bus bars.

2. The battery module according to claim 1, wherein the bus bar fixing portion has a hook structure whose hook shape is elongated in the right and left direction to press at least one of the top end and the bottom end of each of the plurality of bus bars in the inward direction.

3. The battery module according to claim 1, wherein:
a plurality of fixing protrusions protruding toward each of the plurality of bus bars are formed at predetermined intervals on an inner surface of the insert groove; and
a fitting groove having an upward recess is formed at an end of each of the plurality of bus bars so that the fixing protrusion is inserted therein.

4. The battery module according to claim 1, wherein a compressing protrusion configured to press the bottom end of the respective bus bar in the outward direction is formed at an inner surface of the insert groove.

5. The battery module according to claim 1, wherein the bus bar open portion is opened in a length greater than the length of each bus bar in the right and left direction.

6. The battery module according to claim 5, wherein the bus bar open portion has a single opening so that a rear surface of each of the plurality of bus bars mounted to the outer side surface is partially exposed inwards.

7. A battery pack, comprising at least one battery module defined in claim 1.

8. A vehicle, comprising the battery pack defined in claim 7.

* * * * *